United States Patent [19]

Kamikaseda et al.

[11] Patent Number: 4,687,809
[45] Date of Patent: Aug. 18, 1987

[54] ROOM TEMPERATURE SETTING ADHESIVE COMPOSITION

[75] Inventors: Takeshi Kamikaseda, Suita; Makoto Yamamoto, Shiga, both of Japan

[73] Assignee: National Starch and Chemical Corporation, Bridgewater, N.J.

[21] Appl. No.: 877,830

[22] Filed: Jun. 24, 1986

[30] Foreign Application Priority Data

Jun. 25, 1985 [JP] Japan ............................ 60-139973

[51] Int. Cl.$^4$ ............................................. C08L 29/04
[52] U.S. Cl. ................................. 525/57; 156/327; 156/335; 524/510; 525/58
[58] Field of Search .................. 525/57, 58, 300; 524/510; 156/327, 335

[56] References Cited

U.S. PATENT DOCUMENTS 4,124,554 11/1978 Fry .................................. 524/510 X
4,125,502 11/1978 Nakamura ...................... 524/510 X Primary Examiner—Theodore E. Pertilla
Attorney, Agent, or Firm—Margaret B. Kelley; Edwin M. Szala

[57] ABSTRACT

A room temperature setting adhesive composition capable of giving high initial bond strength as well as cured bonds having good resistance to water and boiling contains, as main components thereof, (A) an emulsion containing an acetoacetylated polyvinyl alcohol and a vinyl acetate copolymer produced by copolymerizing an acetoacetylated, ethylenically unsaturated monomer and another ethylenically unsaturated monomer and (B) a resorcinol resin precondensate and, as a curing agent, (C) hexamethylenetetramine.

3 Claims, 1 Drawing Figure

ROOM TEMPERATURE SETTING ADHESIVE COMPOSITION

BACKGROUND OF THE INVENTION

1. Field of the Invention

This invention relates to a room temperature setting adhesive composition capable of giving high initial bond strength and cured bonds having good water resistance and good boiling water resistance.

2. Description of the Prior Art

Emulsions based on polyvinyl acetate or vinyl acetate copolymers (hereinafter referred to as "PVAc emulsions") are in general use as room temperature setting adhesives. However, when used for bonding purposes, such PVAc-based emulsions give cured products or bonds poor in water resistance and in boiling water resistance, so that their use is limited to indoor applications. To remedy such disadvantage, adhesives comprising a PVAc emulsion, a resorcinol resin precondensate and formaldehyde or paraformaldehyde and adhesives of the same nature as above except that hexamethylenetetramine is used in lieu of said aldehyde have already been proposed.

However, the adhesives obtained by admixing a resorcinol resin precondensate and formaldehyde or paraformaldehyde with the above-mentioned PVAc emulsion have a strong formalin odor and this is of no small concern from the safety and hygiene viewpoint. Moreover, formalin released from such adhesives may offer various problems on the adherend side. As for the adhesives in which hexamethylenetetramine is used in lieu of the aldehyde and which can thus be regarded as improved forms, such problems due to the use of formalin as mentioned above can indeed be solved but said adhesives are still disadvantageous in that the rate of curing is very slow at room temperature, so that heating after spreading is required for their practical use. To remove such drawback, an adhesive has been proposed which comprises a vinyl acetate emulsion containing an acetoacetylated polyvinyl alcohol, a resorcinol resin precondensate and hexamethylenetetramine. This adhesive is advantageous in that it can be cured rapidly at room temperature and has very little formalin odor. Regrettably, however, the use of the above resorcinol resin precondensate in an amount not lower than a certain threshold level is essential for said adhesive to give cured products which are satisfactory with respect to water resistance, boiling water resistance, etc., but the use of the resorcinol resin precondensate in increased amounts disadvantageously causes a decrease in initial bond strength.

SUMMARY OF THE INVENTION

It is an object of the invention, which has now been made in such circumstances, to provide a room temperature setting adhesive composition capable of giving bonds excellent in all aspects, including water resistance and boiling water resistance, with high initial bond strength and producible with minimal formalin odor emanation without offering particular safety or hygiene problems.

In accordance with the invention, the above object can be accomplished by providing a room temperature setting adhesive composition containing, as main components thereof, (A) a polyvinyl acetate emulsion containing an acetoacetylated polyvinyl alcohol and (B) a resorcinol resin precondensate and, as a curing agent, (C) hexamethylenetetramine characterized in that said polyvinyl acetate emulsion is an emulsion of a vinyl acetate copolymer produced by copolymerizing an acetoacetylated, ethylenically unsaturated monomer and another ethylenically unsaturated monomer.

BRIEF DESCRIPTION OF THE DRAWING:

In the accompanying drawing.

DETAILED DESCRIPTION OF THE INVENTION

Figure 1:
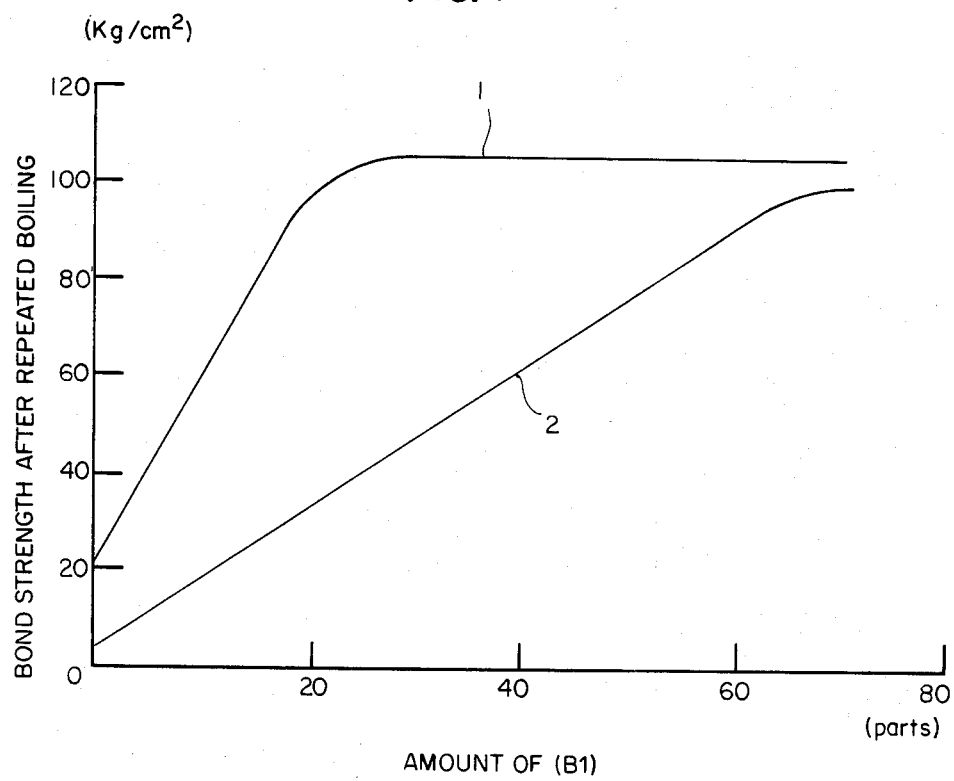
FIG. 1 is a diagrammatic representation showing the relation between the bond strength after repeated boiling and the proportion of a resorcinol resin precondensate.

The present inventors conducted an intensive study to improve the above-mentioned adhesive composition according to the latest proposal with particular attention to the acetoacetylated polyvinyl alcohol-containing polyvinyl acetate emulsion, which is the main component. As a result, it has been found that the above-mentioned object can be achieved when a vinyl acetate polymer produced by copolymarization of an acetoacetylated, ethylenically unsaturated monomer and another ethylenically unsaturated monomer, not a simple vinyl acetate polymer, is used as the polymer in the above mentioned polyvinyl acetate emulsion. The present invention has been completed on the basis of this finding.

The room temperature setting adhesive composition is produced from said vinyl acetate emulsion containing an acetoacetylated polyvinyl alcohol (hereinafter, "AAcPVA polymer"), a resorcinol resin precondensate and hexamethylenetetramine (hereinafter, "HMTA").

The AAcPVA polymer to be contained in the above-mentioned emulsion is used for the purpose of increasing the stability of the vinyl acette polymer emulsion as well as for the purpose of improving the compatibility of said emulsion with said resorcinol resin precondensate and can be produced by a known method, namely by acetoacetylating a polyvinyl alcohol (hereinafter. "PVA" polymer with an acetoacetylating agent in ordinary use, such as diketene, acetoacetic acid or an acetoacetate ester. Thus, for example, it can easily be obtained using diketene, for instance, by the method comprising adding a PVA polymer to acetic acid and then adding diketene for effecting the acetoacetylation reaction, by the method comprising adding diketene to a solution of a PVA polymer in a solvent such as dimethylformamide or dioxane to thereby effect the reaction, by the method comprising directly reacting a PVA polymer with diketene or by the like known method. As the PVA polymer to be used in that case, there may be mentioned a partial or complete saponification product derived from polyvinyl acetate, a saponification product derived from a copolymer of vinyl acetate and one or more other ethylenically unsaturated monomers, and a partial acetalization product derived therefrom, for instance. Water-soluble ones are preferred and, among them, polyvinyl alcohol species having a degree of polymerization of 200–3,000 and a degree of saponification of 30–100 mole percent are most suitable. The degree of acetoacetylation of the AAcPVA polymer obtained in the above manner should preferably be within the range of 0.1–15 mole percent, in which adhesive compositions prepared in accordance with the invention can give good results with respect to reactivity water resistance of bonds and stability of emulsion.

The vinyl acetate polymer, which is the main component of the above-mentioned emulsion, can be prepared by copolymerizing an acetoacetylated, ethylenically unsaturated monomer (hereinafter, "AAc monomer") and another ethylenically unsaturated monomer. Said AAc monomer can be prepared by acetoacetylating hydroxyethyl acrylate or hydroxyethyl methacrylate, for instance, with an acetoacetylating agent in common use, such as diketene, acetoacetic acid or an acetcacetate ester. When diketene, for instance, is used as the acetoacetylating agent, the AAc monomer can readily be obtained by a known method, for example by adding phenothiazine (polymerization inhibitor) and triethylamine (catalysts) i.e., hydroxyethyl acrylate or the like and adding diketene thereto slowly thereby effecting the reaction. Said other ethylenically unsaturated monomer means vinyl acetate or a mixture of vinyl acetate and one or more other ethylenically unsaturated monomers such as (meth)acrylic acid, alkyl (meth)acrylates, ethylene, styrene, vinyl chloride and vinyl versatate.

The resorcinol resin precondensate to be used in the practice of the invention is, for example, a precondensate from a resorcinol, such as resorcinol or an alkylresorcinol, and an aldehyde, such as formaldehyde, or a precondensate from a resorcinol plus a phenol, such as phenol, or an amine, such as urea, melamine or guanamine, and an aldehyde. More specifically, there may be mentioned resorcinol-aldehyde precondensate, alkylresorcinol-aldehyde precondensate, resorcinol-phenol-aldehyde precondensate, alkylresorcinol-phenol-aldehyde precondensate, resorcinol-melamine-aldehyde precondensate, resorcinol-urea-aldehyde precondensate and resorcinol-quanamine-aldehyde precondensate, among others. Particularly preferred among these resorcinol resin precondensates are resorcinol-aldehyde precondensate, alkyl-resorcinol-aldehyde precondensate, resorcinol-phenol-aldehyde precondensate and alkylresorcinol-phenol-aldehyde precondensate. These resorcinol resin precondensates can be produced by an ordinary method, for example, by adding formalin slowly to a solution of resorcin in a solvent, such as an alcohol, in the presence of a catalyst, such as oxalic acid to thereby effect the reaction.

Any grade of HMTA which is in general use can be used in the practice of the invention.

The room temperature setting adhesive composition according to the invention is produced by compounding the vinyl acetate polymer emulsion (A) containing the above-mentioned AAcPVA polymer, the resorcinol resin precondensate (B) and hexamethylenetetramine (HMTA) (C). It can be produced in the following manner, for instance.

Thus, the AAcPVA polymer-containing vinyl acetate polymer emulsion (A) is prepared by emulsion-polymerizing an AAc monomer and a monomer such as vinyl acetate in the presence of an AAcPVA polymer. In this connection, the proportion of AAc monomer is preferably in the range of 0.4–20 weight percent (hereinafter referred to briefly as %) based on the total amount of the constituent monomers of the vinyl acetate polymer. If the proportion is less than 0.4%, it is necessary to add a large amount of resorcinol resin precondensate in order to ensure a sufficient resistance of the bond to water, boiling, etc. and consequently the initial bond strength tends to deteriorate. On the other hand, if the proportion of AAc monomer exceeds 20%, it becomes difficult to copolymerize vinyl acetate and other monomers so that a stable emulsion is hardly obtainable. Even if the resulting emulsion is stable at any rate, the final adhesive will have only a short pot life and be of little practical use.

The preferred AAcPVA polymer content of the above emulsion (A) on a nonvolatile matter basis is 0.2 to 20 weight parts (hereinafter referred to briefly as parts) to each 100 weight parts of the vinyl acetate polymer. If the proportion is less than 0.2 parts, the water resistance of the resulting bond is insufficient and the compatibility of the emulsion with the resorcinol resin precondensate tends to deteriorate. On the other hand, if the proportion of AAcPVA polymer exceeds 20 parts, the water resistance of the bond tends to decrease because the AAcPVA polymer itself is inherently water-soluble.

The emulsion polymerization may be carried out by the conventional method. The AAcPVA polymer itself can act as an emulsifying agent and, therefore, the emulsion polymerization of an AAc monomer with vinyl acetate and/or other monomer in the presence of a resorcinol polymer does not require an emulsifying agent but an ordinary nonionic surfactant may be added in a suitable amount. As the emulsion polymerization catalyst, choice may be made from among the catalysts commonly used for emulsion polymerization, such as persulfates, hydrogen peroxide, redox catalysts and so on.

To the emulsion (A) obtained in the above manner is added a resorcinol resin precondensate (B). The preferred mixing ratio is 10 to 50 parts of (B) to each 100 parts of (A). If the proportion of (B) is less than 10 parts, water resistance, boiling resistance, etc. of the bond are not fully satisfactory. On the other hand, if the proportion of (B) exceeds 50 parts, there is a marked reduction in initial bond strength.

The above-mentioned HMTA is then added to the resorcinol resin precondensate-containing emulsion (A)+(B) thus obtained. Regarding the proportion of HMTA, it is preferable from the standpoint of water resistance of the bond to use 2 to 30 parts of HMTA to each 100 parts of (A)+(B) on a nonvolatile matter basis.

If necessary, the above composition may be supplemented with fillers such as calcium carbonate, talc, clay, etc. and/or film coalescing aids such as dibutyl phthalate, dioctyl phthalate, butylcarbitol acetate, tetrahydrofurfuryl alcohol and so on.

By the above series of procedures, there can be obtained a room temperature setting adhesive composition according to the present invention. This room temperature setting adhesive composition is put to use by mixing the above-mentioned components A to C. And this adhesive composition is odorless, features a high initial bond strength, and provide a cured product excellent in water resistance and boiling resistance.

It will be apparent from the foregoing description that the room temperature setting adhesive composition according to the present invention has no formalin odor because it does not contain an aldehyde such as formaldehyde or paraformaldehyde, is easy to work with, and is capable of bonding wood, bamboo, cloth and other adherends firmly at room temperature. Furthermore, as the bond after curing is highly resistant to water and boiling, for instance, this adhesive composition can be used advantageously in outdoor applications for which the conventional adhesives are not suited. Moreover, as the adhesive composition of the present invention shows a high initial bond strength, the pressure time necessary for bonding adherends is reduced so that the efficiency of bonding work is improved.

The following working and comparative examples are further illustrative of the present invention.

EXAMPLES 1-11

The AAc monomer acetoacetoxyethyl acrylate was synthesized. Thus, a separable flask equipped with a stirrer, reflux condenser, dropping funnel and thermometer was charged with 290 parts of 2-hydroxyethyl acrylate, 0.025 part of phenothiazine and 0.025 part of triethylamine. While replacing the flask inside atmosphere with nitrogen gas, the flask contents were heated to 70° C. Then, while maintaining the flask inside temperature at 70° C., 220 parts of diketene was added dropwise over 1.5 hours, followed by further two hours of reaction at the same temperature whereby the desired acetoacetoxyethyl acrylate was obtained. The disappearance of the hydroxyl group was confirmed by infrared spectrophotometry of the product.

Using the above acetoacetoxyethyl acrylate, an emulsion (A1) was produced. Thus, a separable flask equipped with a stirrer, reflux condenser, dropping funnel and thermometer was charged with 150 parts of water, 11 parts of an AAcPVA (Nippon Synthetic Chemical Industry's GOHSEFIMER-Z-100; product of 5 mole percent acetoacetylation of PVA (degree of polymerization 500, degree of saponification 99 mole percent)) and 10 parts of vinyl acetate. The flask contents were heated to 60° C., while replacing the flask inside atmosphere with nitrogen gas, with addition of 5 parts of 2% aqueous potassium persulfate as the polymerization catalyst. After 30 minutes of prepolymerization, 65 parts vinyl acetate, 5 parts of the AAc monomer acetoacetoxyethyl acrylate and 20 parts of vinyl versatate VV-10 (Shell Chemical) (ethylenically unsaturated monomer other than vinyl acetate) were added dropwise over 3 hours. After completion of the addition of all the monomers, the whole mixture was ripened at 75° C. for 1 hour to give a vinyl acetate-acetoacetylated monomer copolymer emulsion containing the AAcPVA polymer.

A resorcinol resin precondensate (B1) was prepared. Thus, a separable flask equipped with a stirrer, reflux condenser, dropping funnel and thermometer was charged with 220 parts of resorcinol, 97.4 parts of 37% aqueous formaldehyde and 0.8 part of oxalic acid. The flask contents were heated to 55° C. with stirring. After heating at this temperature for 1 hour, the reaction mixture was cooled, followed by adjustment of the pH to 8.2 by adding 30% aqueous sodium hydroxide. Thus was obtained a resorcinol resin precondensate (B1). The thus-obtained emulsion (A1) and resorcinol resin precondensate (B1) were used, together with hexamethylenetetramine (HMTA), in the proportions given in Table 1 to make up seven adhesive compositions (Examples 1-11).

COMPARATIVE EXAMPLES 1-5

For comparison, AAc monomer-free adhesive compositions were prepared in the same manner as in the above examples. Thus, in the comparative examples an emulsion (X) was prepared by using 70 parts of vinyl acetate in lieu of 65 parts of vinyl acetate plus 5 parts of acetoacetoxyethyl acrylate used in the production of emulsion (A1) in the above examples. The emulsion (X), the resorcinol resin precondensate (B1) and hexamethylenetetramine were blended in the proportions given in Table 2 to give 5 adhesive compositions (Comparative Examples 1-5).

The adhesive compositions thus obtained in Examples 1-11 and Comparative Examples 1-5 were subjected to bond strength testing by the methods mentioned below. The test results obtained are shown in Table 1 and Table 2.

[Bond strength test 1]

Birch blocks were used to prepare test specimens. According to JIS K 6804, the blocks were bonded together in pairs using each of the above adhesive compositions in a spread of about 200 g/m$^2$ and kept under pressure for 1 day. After release of pressure loading, the test specimens were allowed to stand for 48-72 hours and then measured for bond strength. Another set of test specimens prepared by bonding, keeping under pressure and pressure removal in the same manner as above were immersed in water at 20° C. for 24 hours and then measured for bond strength for comparison with respect to water resistance. Similarly, test specimens after removal of pressure loading were immersed in boiling water for 72 hours, then cooled and tested for bond strength for comparison with respect to boiling water resistance. Furthermore, the bond strength after repeated boiling was measured by the method described in JIS K 6802. For initial bond strength measurement, hemlock spruce boards, 40 mm in width and 80 mm in length, were prepared and coated on both sides with each adhesive composition in a spread of 300 g/m$^2$. Immediately thereafter a plywood piece, 50 mm in width and 100 mm in length, was applied to each side. A pressure of 7 kg/cm$^2$ was applied to the specimens obtained in this manner for 20 minutes and, immediately after removal of pressure loading, the plywood pieces bonded to both sides of the hemlock spruce board were drawn apart at a drawing rate of 100 mm/min and the force required to cause failure of the bond was recorded.

TABLE 1

| | | Example | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Adhesive | (A1) | 100 | 100 | 100 | 100 | 100 | 100 | 100 | 100 | 100 | 100 | 100 |
| component | (B1) | 5 | 10 | 20 | 35 | 50 | 70 | 20 | 20 | 20 | 20 | 20 |
| (parts) | HMTA | 10.5 | 11.0 | 12.0 | 13.5 | 15.0 | 17.0 | 1.2 | 2.4 | 18.0 | 36.0 | 48.0 |
| Odor | | Odorless | Odorless | Odorless | Odorless | Odorless | Odorless | Odorless | Odorless | Odorless | Odorless | Odorless |
| Property of mixture | | Good | Good | Good | Good | Good | Good | Good | Good | Good | Good | Good |
| Bond strength (20° C.) | | 200 | 200 | 210 | 200 | 200 | 210 | 180 | 200 | 200 | 200 | 200 |
| Bond strength after immersion in water for 24 hours | | 80 | 90 | 120 | 110 | 110 | 100 | 70 | 90 | 110 | 110 | 80 |
| Bond strength after immersion in boiling | | 20 | 40 | 90 | 80 | 100 | 90 | 40 | 60 | 80 | 80 | 40 |

TABLE 1-continued

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| water for 72 hours | | | | | | | | | | | |
| Bond strength after repeated boiling | 40 | 60 | 110 | 100 | 110 | 100 | 50 | 70 | 110 | 100 | 50 |
| Initial bond strength (kg/4 cm) | 27 | 26 | 24 | 16 | 12 | 8 | 22 | 23 | 22 | 24 | 23 |

TABLE 2

| | | Comparative Example | | | | |
|---|---|---|---|---|---|---|
| | | 1 | 2 | 3 | 4 | 5 |
| Adhesive component (parts) | (X) | 100 | 100 | 100 | 100 | 100 |
| | (B1) | 10 | 20 | 35 | 50 | 70 |
| | HMTA | 11.0 | 12.0 | 13.5 | 15.0 | 17.0 |
| Odor | | Odorless | Odorless | Odorless | Odorless | Odorless |
| Property of mixture | | Good | Good | Good | Good | Good |
| Bond strength (20° C.) | | 170 | 190 | 200 | 200 | 210 |
| Bond strength after immersion in water for 24 hours | | 40 | 60 | 70 | 90 | 110 |
| Bond strength after immersion in boiling water for 72 hours | | 0 | 20 | 40 | 60 | 90 |
| Bond strength after repeated boiling | | 20 | 30 | 60 | 80 | 100 |
| Initial bond strength (kg/4 cm) | | 25 | 23 | 16 | 11 | 7 |

Comparing Examples 1 to 6 in Table 1 with Comparative Examples 1 to 5 in Table 2, one finds that the adhesive compositions according to the present invention are excellent in water resistance and bond strength after boiling notwithstanding the low resorcinol resin precondensate (B1) contents. Thus, whereas the adhesive compositions of the Comparative Examples must contain about 50 parts of resorcinol resin precondensate (B1) in order to have practically useful degrees of water resistance and boiling resistance, the precondensate (B1) contents required in the Examples of the present invention are only one-half or less. Furthermore, it will be apparent from Table 1 and Table 2 that the larger the proportion of resorcinol resin precondensate (B1) is, the lower is the initial bond strength. However, the adhesive compositions according to the present invention ensure excellent resistance of the bond to water and boiling even if the proportion of resorcinol resin precondensate (B1) is small and, moreover, for the very reason that the precondensate content is low, there is no decrease in initial bond strength. Thus, the adhesive compositions according to the present invention are not only excellent in resistance of the bond to water and boiling but also in initial bond strength. Furthermore, as will be apparent from Examples 7 to 11, the water resistance decreases as the amount of HMTA becomes excessive relative to the emulsion (A1). Therefore, the proportion of HMTA is preferably within the range of 2 to 30 parts to each 100 parts of (A1)+(B1).

Referring, now, to the values of bond strength after repeated boiling in Tables 1 and 2, the relation between bond strength after repeated boiling and amount of resorcinol resin precondensate (B1) was plotted for reference. The plots are given in FIG. 1.

In FIG. 1, the curve (1) represents the data on Examples 1 to 6 and the curve (2) represents the data on Comparative Examples 1 to 5. According to FIG. 1, the proportion of (B1) at which the bond strength after repeated boiling reaches a point of saturation is (B1)/(A1)=20/100 for Examples of the present invention, while the corresponding proportion for Comparative Examples is (B1)/(X)=60/100. Therefore, using the adhesive composition of the present invention (Example 3) and the conventional adhesive composition (Comparative Example 6), which corresponded to the above-mentioned points of saturation, the relation between pressure time and initial bond strength was investigated.

[Bond strength test 2]

First, by the same procedure as used in testing the initial bond strength in Bond strength test 1, the pull-apart strengths of the above adhesive compositions were measured. However, the varying pressure times of 10, 20 and 30 minutes were used.

Then, using birch blocks as adherends, each of the above adhesive compositions was applied at a spread of about 300 g/m² and after a pressure time of 20, 40, 60 or 80 minutes, the compression shear strength of each test piece was immediately measured in accordance with JIS K 6804. The results are shown in Table 3.

TABLE 3

| | | Pull-apart strength (kg/4 cm) Pressure time (min.) | | | Compression shear strength (kg/cm²) Pressure time (min.) | | | |
|---|---|---|---|---|---|---|---|---|
| | Mixing ratio | 10 | 20 | 30 | 20 | 40 | 60 | 80 |
| Example 3 | (A1)/(B1)/HMTA = 100/20/12 | 15 | 24 | 28* | 70 | 90 | 110 | 140 |
| Compar. Example 6 | (X)/(B1)/HMTA = 100/60/16 | 6 | 11 | 15 | 30 | 50 | 75 | 90 |

*The test piece was destroyed.

It is apparent from the data given in Table 3 that as compared with Comparative Example 6, Example 3 of the present invention develops a necessary bond strength more than twice as early. This means that the pressure time necessary for a given bond strength is shorter and obviously this is a great practical advantage.

EXAMPLES 12–21

In the preparation of emulsion (A1) according to Example 1, the AAc monomer acetoacetoxyethyl acrylate was used in a varying proportion of 0.2, 0.4, 2, 10 or 20% based on total monomer and 100 parts of each emulsion so obtained was mixed with 20 parts of (B1) and 12 parts of HMTA to prepare an adhesive composition. Using these adhesive compositions, the bond strength test described in Example 1 was performed. The results are shown in Table 4.

Further, in the preparation of emulsion (A1) according to Example 1, GOHSEFIMER Z-100, an AAcPVA polymer, was used in a varying proportion of 0.2, 1, 5, 11, 20 or 25 parts, and 100 parts of each resulting emulsion was mixed with 20 parts of (B1) and 12 parts of HMTA to prepare an adhesive composition. Using the adhesive compositions thus obtained, the bond strength test described in Example 1 was performed. The results are shown in Table 4.

TABLE 4

| Example | Amount | Bond strength after standing in normal condition | Bond strength after immersion in water | Bond strength after boiling | Bond strength after repeated boiling |
|---|---|---|---|---|---|
| 12 | AAc monomer, 0.2 (wt %) | 200 | 60 | 30 | 50 |
| 13 | 0.4 | 200 | 80 | 60 | 80 |
| 14 | 2 | 200 | 100 | 80 | 90 |
| 15 | 10 | 210 | 120 | 90 | 110 |
| 16 | 20 (*1) | 200 | 100 | 80 | 100 |
| 17 | Z-100 (*2), 0.2 (part) | 200 | 100 | 60 | 60 |
| 18 | 1 | 200 | 110 | 90 | 100 |
| 19 | 5 | 200 | 100 | 80 | 100 |
| 20 | 11 | 210 | 120 | 90 | 110 |
| 21 | 20 | 210 | 100 | 70 | 70 |
| 22 | 25 | 210 | 90 | 40 | 50 |

(*1): The polymerizability was more or less poor.
(*2): GOHSEFIMER-Z-100

It is apparent from Examples 12 to 16 in Table 4 that when the copolymerizing amount of AAc monomer is less than 0.4 percent, the bond strength after boiling and that after repeated boiling are considerably sacrificed. In regard to Examples 17 to 22, it is clear that when the proportion of GOHSEFIMER Z-100, an AAcPVA polymer, exceeds 20 parts, the bond strength after boiling and that after repeated boiling tend to decrease. It was also found that polymerizability is sacrificed when the amount of AAcPVA polymer is less than 0.2 part. In this connection, the use of emulsifying agents was attempted in hopes of improving the polymerizability but such attempts failed in effect, for the water resistance of adhesive compositions deteriorated.

EXAMPLES 23-27

A separable flask fitted with a stirrer, a reflux condenser, dropping funnel and thermometer was filled with 150 parts of water, 8 parts of an AAcPVA polymer (Nippon Synthetic Chemical Industry, GOHSEFIMER Z-200; 4.5 mole % acetoacetylated PVA with a degree of polymerization of 1700 and a saponification degree of 99 mole %, 2 parts of another AAcPVA polymer (Nippon Synthetic Chemical Industry, GOHSEFIMER Z-100) and 10 parts of vinyl acetate, and the internal temperature of the flask was increased to 60° C. with stirring. In this procedure, with the atmosphere in the flask being replaced with nitrogen gas, 3 parts of a 10% aqueous solution of tartaric acid and 5 parts of a 10% aqueous solution of hydrogen peroxide were added as the polymerization catalyst. The prepolymerization was conducted for 30 minutes, at the end of which time 88 parts of vinyl acetate and 2 parts of acetoacetoxyethyl acrylate, an AAc monomer, were added in portions over a period of 3 hours. The mixture was ripened at 75° C. for 1 hour to give a vinyl acetate-AAc monomer copolymer emulsion (A2) containing the AAcPVA polymers.

On the other hand, a separable flask fitted with a stirrer, reflux condenser, dropping funnel and thermometer was filled with 210 parts of resorcinol, 10 parts of phenol, 107 parts of 37% formaldehyde and 1 part of oxalic acid and the internal temperature of the flask was increased to 95° C. with stirring. The mixture was heated at that temperature for 1 hour and after cooling, the reaction mixture was adjusted to pH 8.2 with 30% NaOH to give a resorcinol resin precondensate (B2).

Separately, as another resorcinol resin precondensate (B3), an alkylresorcinol/aldehyde precondensate (Nagoya Yukagaku Kogyo, DFK-INB) was provided.

The above emulsion (A2) and resorcinol resin precondensates (B2) and (B3) were mixed with the emulsion (A1) and resorcinol resin precondensate (B1) used in Example 1 in the combinations shown in Table 5 to give different adhesive compositions. The mixing ratio, on a nonvolatile matter basis, of said emulsion, resorcinol resin precondensate and HMTA was 100:20:12.

Using these adhesive compositions of Examples 23 to 27, the bond strength test described in Example 1 was carried out. The results are shown in Table 5.

TABLE 5

|  | Example | | | | |
|---|---|---|---|---|---|
|  | 23 | 24 | 25 | 26 | 27 |
| Emulsion | A1 | A1 | A2 | A2 | A2 |
| Resorcinol resin precondensate | B2 | B3 | B1 | B2 | B3 |
| Odor | Odorless | Odorless | Odorless | Odorless | Odorless |
| Property of mixture | Good | Good | Good | Good | Good |
| Bond strength after normal standing | 200 | 200 | 200 | 190 | 210 |
| Bond strength after immersion in water | 90 | 100 | 110 | 100 | 100 |
| Bond strength after boiling | 80 | 80 | 80 | 70 | 80 |
| Bond strength after repeated boiling | 100 | 90 | 100 | 90 | 100 |

It is apparent from the data in Table 5 that an alkylresorcinol-aldehyde precondensate or a precondensate of resorcinol and phenol with aldehyde can also be used successfully as said resorcinol resin precondensate.

What is claimed is:

1. A room temperature setting adhesive composition containing, as main components thereof, (A) a polyvinyl acetate emulsion containing an acetoacetylated polyvinyl alcohol and (B) a resorcinol resin precondensate and, as a curing agent, (C) hexamethylenetetramine, characterized in that said polyvinyl acetate emulsion is an emulsion of a vinyl acetate copolymer produced by copolymerizing an acetoacetylated, ethylenically unsaturated monomer and another ethylenically unsaturated monomer.

2. The room temperature setting adhesive composition of claim 1, wherein component (B) is contained in an amount of 10-50 parts by weight per 100 parts by weight of component (A) on the solid content basis and wherein component (C) is contained in an amount of 2-30 parts by weight per 100 parts by weight of the sum total of components (A) and (B) on the solid content basis.

3. The room temperature setting adhesive composition of claim 1 or 2, wherein component (A) contains said acetoacetylated polyvinyl alcohol in an amount of 0.2-20 parts by weight per 100 parts by weight of said vinyl acetate copolymer.

* * * * *